United States Patent
Kwok et al.

(10) Patent No.: US 10,750,456 B2
(45) Date of Patent: Aug. 18, 2020

(54) SYSTEMS AND METHODS FOR MANAGING CELLULAR MULTI-CONNECTIVITY

(71) Applicant: T-Mobile USA, Inc., Bellevue, WA (US)

(72) Inventors: Ming Shan Kwok, Seattle, WA (US); Thomas P. Lucht, Seattle, WA (US); Wei-Ming Lan, Morrisville, NC (US); Yasmin Karimli, Kirkland, WA (US); Wafik Abdel Shahid, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 81 days.

(21) Appl. No.: 16/125,087

(22) Filed: Sep. 7, 2018

(65) Prior Publication Data
US 2020/0084734 A1  Mar. 12, 2020

(51) Int. Cl.
*H04W 4/00* (2018.01)
*H04W 52/36* (2009.01)
*H04W 76/38* (2018.01)
*H04W 36/30* (2009.01)
*H04W 76/18* (2018.01)

(52) U.S. Cl.
CPC ....... *H04W 52/365* (2013.01); *H04W 36/305* (2018.08); *H04W 52/367* (2013.01); *H04W 76/18* (2018.02); *H04W 76/38* (2018.02)

(58) Field of Classification Search
USPC ........................................ 370/329, 252, 330
See application file for complete search history.

(56) References Cited

U.S. PATENT DOCUMENTS
2015/0195796 A1   7/2015  Sivanesan et al.

FOREIGN PATENT DOCUMENTS
KR        20180026802 A       3/2018

OTHER PUBLICATIONS

Ericsson, "Remaining issues for LTE-NR power sharing", R1-1800958, 3GPP TSG RAN WG1 AH#1801, Jan. 13, 2018, See sections 1-5, 8 pages.
Nokia, et. al., "UE Dynamic power sharing for LTE-NR Dual Connectivity", R1-1800942, 3GPP TSG RAN WG1 AH#1801, Jan. 12, 2018, See sections 1-3, 6 pages.
NTT DOCOMO, Inc., "Impact analysis on NR PHR", R2-1806002, 3GPP TSG RAN WG2 #101bis, Apr. 6, 2018, 13 pages.
PCT Search Report and Written Opinion dated Nov. 25, 2019, for PCT Application No. PCT/US2019/045888, 9 pages.

*Primary Examiner* — Phuongchau Ba Nguyen
(74) *Attorney, Agent, or Firm* — Lee & Hayes, P.C.

(57) ABSTRACT

Systems and methods for managing multiple network connections for user equipment (UE) are disclosed. The systems and methods can monitor power headroom (PHR) reports on one or more networks. When the PHR report for a UE approaches a first predetermined level on a first network, the system can evaluate the UE for a predetermined amount of time. If during the predetermined amount of time, the PHR on the first network increases to a second predetermined level—i.e., to a level where the transmission power used by the UE is closer to a maximum transmission power that the UE can provide—the UE can be instructed to disconnect from the network. This can enable the UE to disconnect in a controlled manner rather than simply letting the connection "drop" due to radio link failure.

19 Claims, 6 Drawing Sheets

SYSTEMS AND METHODS FOR MANAGING CELLULAR MULTI-CONNECTIVITY

BACKGROUND

The latest generation of cellular communications, the fifth-generation (or 5G) network, is being implemented for use in conjunction with existing fourth-generation long term evolution (4G LTE, or just 4G) networks. The 5G network provides improved capacity, reduced latency, and increased speed. In current implementations, the 5G network is often used for applications for which the 5G network is particularly suited, like large file downloads; while the 4G network may be used simultaneously for applications for which the 4G network is particularly suited, like voice calls.

The 4G network generally operates with a relatively low frequency band (e.g., ~600-2300 MHz) within the communications frequency spectrum. 5G, on the other hand, while including some lower frequencies, also contains large blocks in the higher frequency band of the millimeter-wave (mm-wave) spectrum (e.g., 24-86 GHz). All things being equal, higher frequency bands tend to provide shorter propagation distances and shallower penetrations (e.g., into buildings and/or through walls) when compared to lower frequency bands. As a result, when a user equipment (UE) is connected to both 4G and 5G networks at the same time from relatively the same distance (e.g., from the same wireless base station, or WBS), the 5G connection will tend to drop before the 4G connection as the UE moves away from the WBS. Without some management of these connections, the dropped connections may appear as dropped calls for the 5G WBS, which may negatively affect error reporting statistics, among other things.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Examples of the present disclosure can comprise systems and methods for managing connections on user equipment (UE) connected to multiple networks at the same time. The system can include a connection management application to monitor the percentage of the transmission power (TxP) being used by a UE compared to the maximum transmission power the UE can provide ($TxP_{MAX}$). This percentage is commonly referred to as "power headroom." When the power headroom, sometimes referred to below as PHR, on the UE approaches a starting percentage (e.g., 85% or 90%) on a first network, the connection management application can begin monitoring the UE for a predetermined amount of time.

If, during the predetermined amount of time, the PHR increases to a threshold percentage (e.g., 90% or 95%—greater than the starting percentage), then the connection management application can send a signal to a network entity for the first network to disconnect the UE. In this case, the UE can remain connected to a second network for which the PHR is better (i.e., a lower percentage) or for which there is no fallback. If, on the other hand, the PHR stays below the threshold percentage or decreases below the starting percentage during the predetermined amount of time, then the connection management application can stop monitoring the UE. In some cases, when the PHR remains greater than or equal to the starting percentage, but less than the maximum percentage, for the predetermined amount of time, the connection management application can reset a timer and monitor the UE for another predetermined amount of time.

The systems and methods discussed herein are discussed with respect to cellular UE operating on the fourth-generation (4G) and fifth-generation (5G) networks. One of skill in the art will recognize, however, that the present disclosure is not so limited. The systems and methods can be used with other types of equipment and on other types of networks, where the equipment is connected to multiple networks at disparate power levels, propagation distances, or other differences. The systems and methods disclosed herein can be used to disconnect from networks in a controlled manner prior to the connection "dropping" due to poor reception.

As mentioned above, the implementation of the 5G network promises increased speeds, capacity, and overall performance. Previous generation cellular networks have generally been conceived to replace the immediately preceding version. 4G was predominantly designed to replace the 3G network, for example, rather than complement it. The 5G network, on the other hand, was designed to supplement, not replace, the 4G network. Indeed, both networks have strengths and weaknesses that can be used in a complementary manner.

Because the frequency spectrum used for communications is crowded, some of the spectrum selected for the 5G network—approximately 24-86 GHz—is in the millimeter-wave (mm-wave) portion of the spectrum. This high-frequency spectrum is well-suited for transmitting large amounts of data, but has relatively short propagation and penetration distances. As a result, when a UE is connected to both a 4G and a 5G network emanating from the same location (or at least equidistant from the UE), the 5G network will tend to disconnect, or "drop," first as the UE moves away from the wireless base station (WBS).

When a UE drops the connection, however, this is reported as a "radio link failure" (RLF) for the 5G WBS. Thus, the performance and/or reliability reports for the 5G WBS can be negatively affected. In addition, some functions running on the UE could be better terminated, or handed over from the 5G to the 4G network, if done in a more controlled manner. To this end, it would be useful to better manage the UE such that, rather than experiencing an RLF, the UE could intentionally disconnect from the 5G network prior to RLF. This can enable the UE to "gracefully" disconnect from the 5G network in a controlled manner to enable the UE to finish a download, for example, handover an application to the 4G network, and perform other handover functions prior to RLF.

Figure 1:
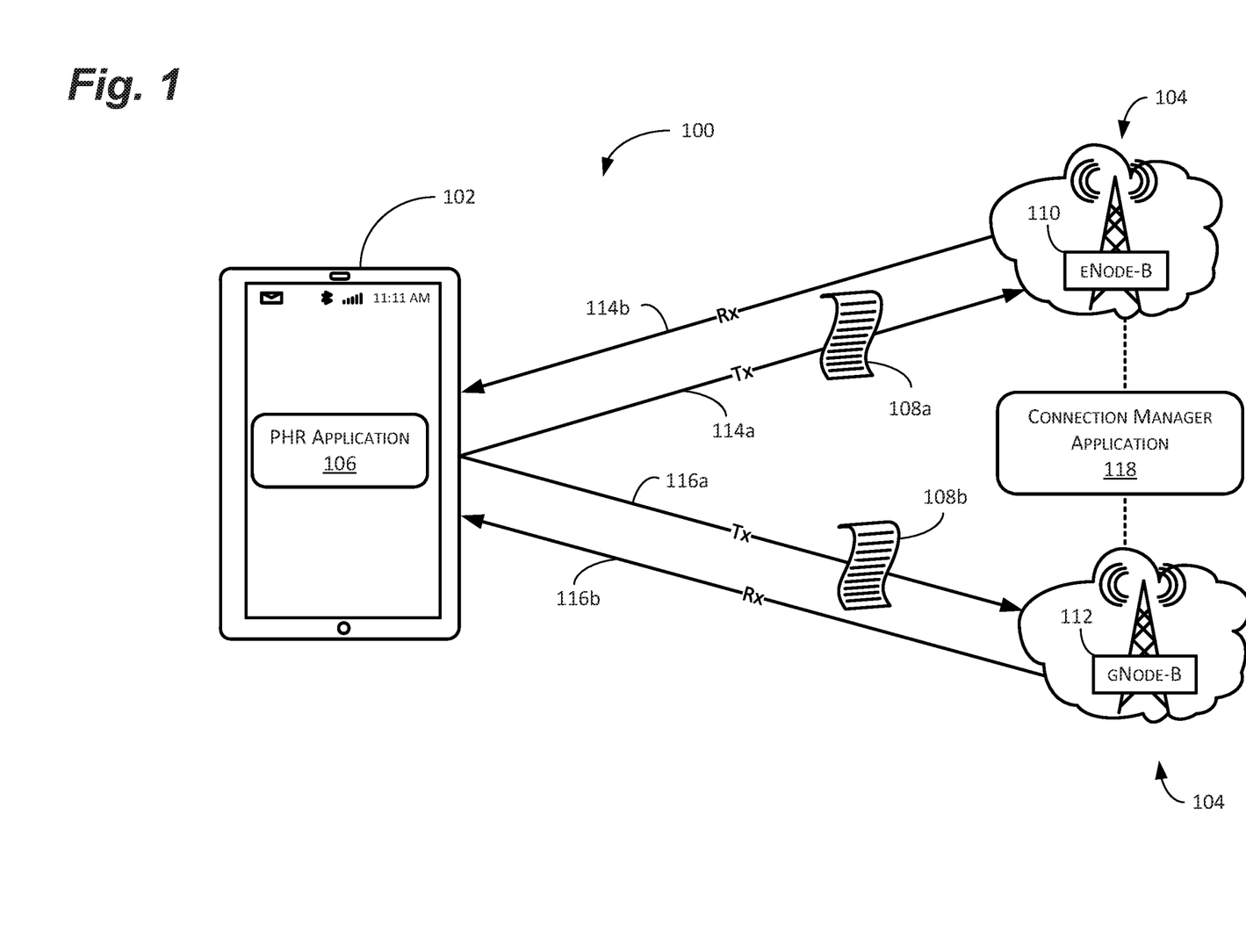
FIG. 1 depicts an example of a system for managing a user equipment (UE) connected to multiple networks, in accordance with some examples of the present disclosure.

To this end, as shown in FIG. 1, examples of the present disclosure can comprise a system 100 for managing dual connectivity UEs. The system 100 can monitor connection strength and/or quality via the PHR reports provided by the UE and disconnect the UE from networks as the UE approaches a $TxP_{MAX}$ to prevent uncontrolled disconnections, or dropped connections. The system 100 is shown in conjunction with the 4G and 5G networks; however, one of skill in the art will recognize that the system 100 could be used with other cellular systems; and indeed, other non-cellular wireless communication systems.

As mentioned above and discussed in more detail below with reference to FIG. 5, a UE 102 can include multiple transceivers to enable it to connect to multiple wireless networks, often at the same time. In some examples, this can include connecting to a 4G and a 5G network, for example, via multiple wireless base stations (WBSs) 104. In other examples, a single WBS 104 can include multiple transceivers, with at least one transceiver on each network (e.g., 3G, 4G, and 5G). In still other examples, the UE 102 can also include the ability to connect to additional networks via 2G, Wi-Fi, Bluetooth, and other connections.

The UE 102 can also include a PHR application 106. The PHR application 106 can periodically send a PHR report 108 to one or more of the WBSs 104 to report the transmission power currently being used by the UE 102. As mentioned above, this is generally given as a PHR, or a percentage of $TxP_{MAX}$—i.e., $PHR=TxP/TxP_{MAX}$. Thus, a PHR of 95%, for example, indicates that the UE 102 is transmitting at 95% of $TxP_{MAX}$ and can only increase TxP by another 5%. An advantage of the system 100 disclosed herein is that the PHR application 106 is a feature already included on most, if not all, UE 102. As a result, the system 100 can be used with little or no modification to the UE 102.

In this case, the UE 102 can be connected to a 4G WBS 110, also commonly referred to as an "eNode-B," and a 5G WBS 112, also commonly referred to as a "gNode-B." Thus, the UE 102 can transmit (labeled as Tx) 114a and receive (labeled as Rx) 114b signals to and from the eNode-B 110 using a suitable 4G frequency pair (i.e., one frequency for uplink and another for downlink); and, the UE 102 can transmit 116a and receive 116b signals to and from the gNode-B 112 using a suitable 5G frequency pair.

Using these same links 114a, 116a, the UE 102 can also send a PHR report 108 to each of the WBSs 104. Because each connection—e.g., the connection to the eNode-B 110 and the connection to the gNode-B 112—may involve a different WBS 104 and necessarily includes different frequency pairs, the UE 102 can send a separate PHR report 108 to each WBS 104 or to each transceiver of the same WBS 104 (i.e., a single WBS 104 can include both 4G and 5G transceivers). As mentioned above, the mm-wave frequencies included as part of the 5G spectrum, for example, tend to have shorter propagation and penetration distances when compared to the lower frequencies used for 4G connections. So, the UE 102 can send a first PHR report 108a to the eNode-B 110 and a second PHR report 108b to the gNode-B 112.

The system 100 can also include a connection manager application 118. In some examples, the connection manager application 118 can be included in one, or both, of the WBSs 104. In other examples, the connection manager application 118 can be included in a single WBS 104, where the WBS 104 includes multiple transceivers and is capable of both 4G and 5G connectivity. In still other examples, the connection manager application 118 can be included on a network entity (e.g., a proxy call session control function, or P-CSCF) that is in communication with one, or both, of the WBSs 104. In some examples, the connection manager application 118 can be included only on the WBS 104 for which there is a "fallback" network. In other words, if only the eNode-B 110 and the gNode-B 112 are available to the UE 102—and no 3G connection is available for fallback, for example—then the connection manager application 118 may sometimes be included only on the gNode-B 112.

The connection manager application 118 can monitor the PHR reports 108 to determine when a UE 102 is approaching $TxP_{MAX}$ on a particular network. When the UE 102 approaches a first predetermined PHR (e.g., 85% or 90%), discussed below as $PHR_{START}$, the connection manager application 118 can begin to monitor the UE 102 for a predetermined amount of time. If, during the predetermined amount of time, the PHR continues to increase towards 100%, and reaches a second predetermined PHR (e.g., 90% or 95%), discussed below as $PHR_{DISCONNECT}$, then the connection manager application 118 can send a signal to the WBS 104. The WBS 104, in turn, can send a disconnect signal to the UE 102 to cause the UE 102 to disconnect from the WBS 104 on the respective connection. This can enable the UE 102 to disconnect in a controlled manner, rather than simply dropping the call. If, on the other hand, the PHR decreases or stays the same for the predetermined amount of time, then the UE 102 can remain connected to the WBS 104. This process is discussed below in more detail with reference to FIG. 3.

Figure 2:
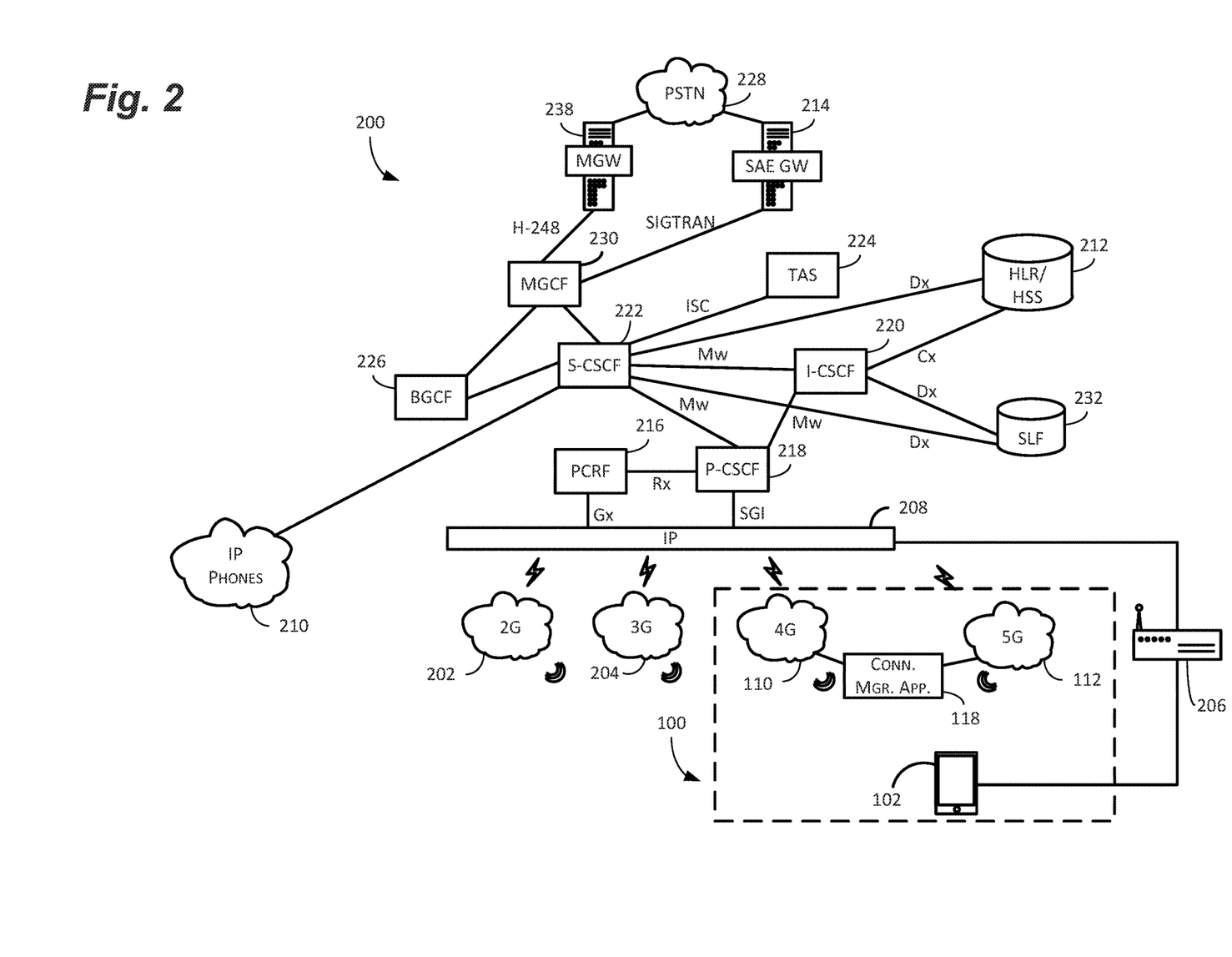
FIG. 2 is the example system of FIG. 1 shown in the context of an internet multimedia subsystem, in accordance with some examples of the present disclosure.

FIG. 2 is an example of the system 100 shown in the context of an internet multimedia subsystem (IMS) 200. As shown, the IMS 200 includes the system 100 and several network components for routing signals, storing subscriber information, and connecting across various subsystems and network types. The IMS 200 is built on SIP as is the base to further support packaging of voice, video, data, fixed, and mobile services on a single platform to end users. It enables communications across multiple types of networks, including cellular, satellite, broadband, cable, and fixed networks, and enables the creation of efficient interoperating networks.

As shown, the IMS 200 also provides interoperability for the UE 102 and other devices across multiple networks including, for example, 2G 202, 3G 204, 4G 110, 5G 112, Wi-Fi 206, and internet protocol (IP) 208 networks. Thus, the IMS 200 provides the interoperability to enable the UE 102 to connect to multiple networks (e.g., the 4G 110 and 5G 112 networks) and multiple networks simultaneously. The UE 102 can connect to the 4G 110 network for some services (e.g., voice calls), for example, and the 5G 112 network for other services (e.g., large downloads).

The IMS 200 also includes a variety of network entities for providing different services, including the connection manager application 118 and/or other applications, discussed herein. Thus, while the connection manager application 118 is shown as a component associated with the 4G 110 and 5G 112 WBSs in this example, the connection manager application 118 could also be included in one or more network entities or as a standalone server, as discussed below.

In some examples, the IMS 200 can include, for example, a home location register/home subscriber service (HLR/HSS) 212, a service architecture evolution gateway (SAE GW) 214, and a policy and charging rules function (PCRF) 216, among other things. The HLR/HSS 212 is a central database that contains user-related and subscription-related information. The functions of the HLR/HSS 212 include functionalities such as mobility management, call and session establishment support, user authentication and access authorization. The HSS, which is used for 4G and 5G connections, is based on the previous HLR and authentication center (AuC) from code division multiple access (CDMA) and global system for mobile communications (GSM) technologies, with each serving substantially the same functions for their respective networks.

To this end, the HLR/HSS 212 could contain some, or all, of the functions of the connection manager application 118. Thus, the HLR/HSS 212 could receive PHR reports 108 from the UE 102 and switch the UE between 4G 110 and 5G 112 connections based on these PHR reports 108, among other things. The HLR/HSS 212 can also serve to provide routing instructions (e.g., IP addresses or phone numbers for various requests), and provide any billing associated with these requests (e.g., to access one network or the other). So, for example, the UE 102 can send requests to the proxy call session control function (P-CSCF) 218, discussed below, which can then provide information to the HLR/HSS 212 with the necessary credentials to enable the UE 102 to access the 4G 110 and 5G 112 networks, for example, via the IMS 200. Once authenticated, the HLR/HSS 212 can then ensure the user is authorized to use the services included in the requests (e.g., to make a call or download a file), for example, or send an authorization request to a third-generation partnership project authentication, authorization, and accounting (3GPP AAA) server, among other things.

The SAE GW 214 routes and forwards user data packets, while also acting as the mobility anchor for the user plane during inter-eNodeB handovers and as the anchor for mobility between 4G 110, 5G 112, and other 3GPP technologies. As such, the SAE GW 214 could also handle some, or all, of the functions of the connection manager application 118. The SAE GW 214 is also responsible, for example, for terminating the S4 interface and relaying traffic between 2G 202/3G 204 systems and the packet data network gateway (PGW). For the UE 102 when in idle state, the SAE GW 214 terminates the downlink data path and triggers paging when downlink data arrives for the UE 102. The SAE GW 214 also manages and stores UE 102 contexts such as, for example, parameters of the IP bearer service and network internal routing information.

The PCRF 216 is a software node that determines policy rules in the overall cellular network, and in the IMS 200 specifically. The PCRF 216 generally operates at the network core and accesses subscriber databases (e.g., via the HLR/HSS 212) and other specialized functions, such as content handling, such as whether the user has sufficient data left in their plan to receive a video call, in a centralized manner. The PCRF 216 is the main part of the IMS 200 that aggregates information between the IMS 200 and other sources. The PCRF 216 can support the creation of rules and then can automatically make policy decisions for each subscriber active on the IMS 200. The PCRF 216 can also be integrated with different platforms like rating, charging, and subscriber databases or can be deployed as a standalone entity.

The IMS 200 also includes the P-CSCF 218. The P-CSCF 218 is the entry point to the IMS 200 and serves as the outbound proxy server for the UE 102. The UE 102 attach to the P-CSCF 218 prior to performing IMS registrations and initiating SIP sessions. The P-CSCF 218 may be in the home domain of the IMS operator, or it may be in the visiting domain, where one or more of the UE 102 are currently roaming. For attachment to a given P-CSCF 218, the UE 102 perform P-CSCF 218 discovery procedures. Attachment to the P-CSCF 218 enables the UE 102 to initiate registrations and sessions with the IMS 200.

The IMS 200 also includes an interrogating-call session control function (I-CSCF) 220. The I-CSCF 220 acts as an inbound SIP proxy server in the IMS 200. During IMS registrations, the I-CSCF 220 queries the HLR/HSS 212 to select the appropriate serving-call session control function (S-CSCF 222), discussed below, which can serve the UE 102. During IMS sessions, the I-CSCF 220 acts as the entry point to terminating session requests. The I-CSCF 220 routes the incoming session requests to the S-CSCF 222 of the called party.

The S-CSCF 222 acts as a registrar server, and in some cases, as a redirect server. The S-CSCF 222 facilitates the routing path for mobile-originated or mobile-terminated session requests. The S-CSCF 222 also interacts with various components for playing tones and announcements, among other things. For the system 100 discussed above, the S-CSCF 222 can receive requests from the UE 102 (e.g., to place a call or download a file), for example, and establish the appropriate sessions with third-party application servers, telephony applications servers (TASs) 224, and other entities according to the services requested by the UE 102 in the requests.

The IMS 200 also includes a breakout gateway control function (BGCF) 226. The BGCF 226 is the IMS 200 element that selects the network in which public switched telephone network (PSTN) 228 (discussed below) breakout is to occur. If the breakout is to occur in the same network as the BGCF 226, for example, then the BGCF 226 selects a media gateway control function (MGCF) 230 (also discussed below) that will be responsible for interworking with the PSTN 228. The MGCF 230 then receives the SIP signaling from the BGCF 226.

The IMS 200 also includes a subscriber location function (SLF) 232. The SLF 232 provides information about the HLR/HSS 212 that is associated with a particular user profile. It is generally implemented using a database. If the IMS 200 contains more than one HLR/HSS 212, then the I-CSCF 220 and S-CSCF 222 will communicate with SLF 232 to locate the appropriate HLR/HSS 212 based on the user profile.

The IMS 200 also includes the aforementioned TAS(s) 224. As the name implies, the TAS 224, sometimes known in a telephony-only context merely as an application server (AS), is a component used to provide telephony applications and additional multimedia functions. The TAS 224 can include any entity in a telephone network that carries out functions that are not directly related to the routing of messages through the network, such as third-party application servers that provide downloads, streaming video, and other services. Such functions can also include, for example, in-network answering machines, automatic call forwarding, conference bridges and other types of applications. And, while shown as a single entity in FIG. 2, multiple TASs 224 are generally used, with each TAS 224 providing one or more separate services. Based on the services requested by the UE 102 to the S-CSCF 222, for example, the S-CSCF 222 can establish sessions with one or more TASs 224, generally with one TAS 224 for each service.

The IMS 200 also includes the MGCF 230. The MGCF 230 is a SIP endpoint that handles call control protocol conversion between SIP and ISDN user part (ISUP)/bearerindependent call control (BICC) and interfaces with the SAE GW 214 over stream control transmission protocol (SCTP). The MGCF 230 also controls the resources in a media gateway (MGW) 238 across an H.248 interface. The MGW 238 is a translation device or service that converts media streams between disparate telecommunications technologies such as POTS, SS7, next generation networks (2G 202, 3G 204, 4G 110, and 5G 112) or private branch exchange (PBX) systems.

Finally, the IMS 200 also includes the PSTN 228. The PSTN 228 is the world's collection of interconnected voice-oriented public telephone networks, both commercial and government-owned. In some cases, the PSTN 228 can also be referred to as the plain old telephone service (POTS). With respect to IP phones 210, for example, the PSTN 228 furnishes much of the Internet's long-distance infrastructure. Because internet service providers (ISPs) pay long-distance providers for access to their infrastructure and share the circuits among many users through packet-switching (discussed above), internet users avoid having to pay usage tolls to anyone other than their ISPs.

Figure 3:
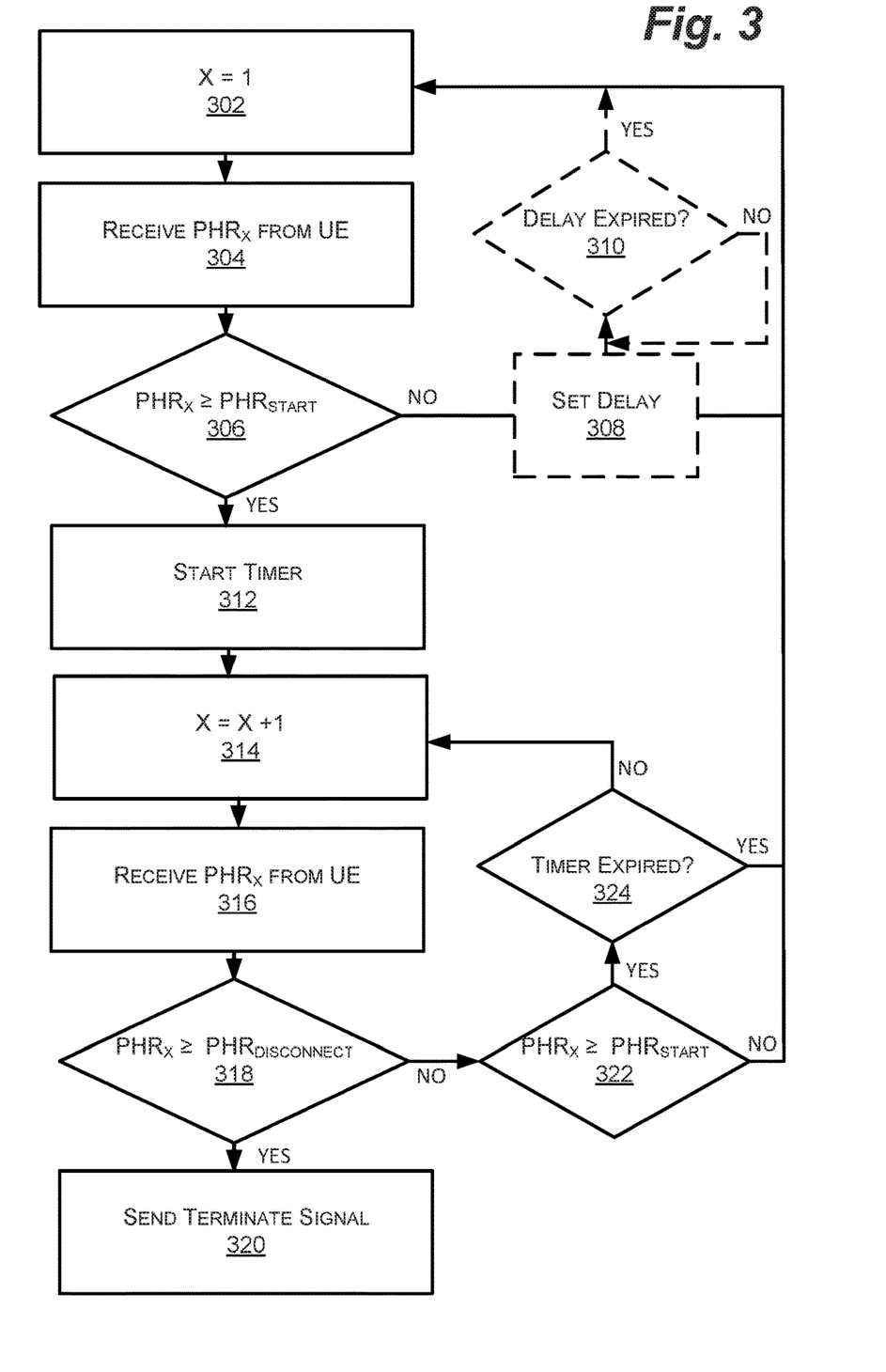
FIG. 3 is a flowchart depicting an example of a method for disconnecting the UE in a controlled manner based on increasing power headroom (PHR) on a network, in accordance with some examples of the present disclosure.

As shown in FIG. 3, examples of the present disclosure can also comprise a method 300 for monitoring the PHR of a UE connected to a first network (e.g., the 5G network) and a second network (e.g., the 4G network) at the same time. The method 300 can monitor the UE for a predetermined time triggered by the PHR exceeding a starting percentage. If during the monitoring period the UE exceeds a second, threshold percentage for PHR, then the connection management application can send a signal to the appropriate network entity (e.g., the WBS) to send a disconnect signal to the UE. This prevents the connection from merely dropping and enables the UE to disconnect from the first network in a controlled manner.

At 302, a counter can be used to determine how many PHR reports have been evaluated. The UE automatically sends PHR reports to the WBS periodically (e.g., every 10 or 20 ms) to enable the WBS to adjust the transmission power used by the UE. Thus, the WBS may compare the signal strength, signal quality, etc. (collectively, the "connection quality") between the WBS and the UE to certain minimum values and maximum values and then send transmission power codes (TPCs) to the UE to increase or decrease the TxP used by the UE. When conditions are good, or the UE is close to the WBS, for example, the TPC may signal the UE to decrease power to minimize battery consumption on the UE and reduce interference with other UE and the WBS. If conditions are poor (e.g., it is raining) or the UE is moving away from the WBS, on the other hand, then the TPC may signal the UE to increase TxP.

Of course, when the UE reaches the $TxP_{MAX}$, if the connection quality continues to degrade, the connection between the UE and the WBS will eventually drop. This can negatively affect the performance and/or reliability statistics for the WBS, which, ideally, would rather "hand-off" the call to another WBS or another network (e.g., from 5G to 4G), rather than dropping the call. In addition, as mentioned above, for a UE with both a 4G and a 5G connection with the WBS, the 5G connection will tend to drop first. And, due to the relatively short propagation and penetration distances of mm-wave frequencies, the 5G connection may drop before the UE comes into range of another 5G WBS, making handover on the 5G network impossible. Thus, in this case, it would be preferable to disconnect the 5G connection and revert to a 4G-only connection in a controlled manner.

At 304, the WBS can receive a PHR report ($PHR_x$) from the UE. In this case, because it is the first report received (i.e., X=1), it is $PHR_1$. Of course, while discussed herein as a PHR report, $PHR_1$ can also be reported to the WBS as an absolute decibel level (e.g., 17 dBm), or in any other useful form.

At 306, the WBS can determine if $PHR_1$ is greater than or equal to a predetermined level—$PHR_{START}$—the PHR value at which the system will begin to monitor the UE. This can be set as a threshold level at which the UE is approaching $TxP_{MAX}$ (e.g., 90% or 95% of $TxP_{MAX}$), at which the connection is likely to become unstable, or at some other suitable level. At this point, if the TxP continues to increase, then it may be desirable to disconnect the UE from the WBS in a controlled manner to prevent the call from dropping.

If $PHR_1$ is not equal to, or greater than $PHR_{START}$, then it is not yet necessary to monitor the UE. In this case, the method 300 can reset and return to step 302. In other words, to conserve resources, more frequent monitoring is triggered only when $PHR_1$ is greater than or equal to $PHR_{START}$. Below that threshold, it is safe to assume that few UEs will have connection problems.

Optionally, at 308, in some examples, the WBS may set a delay (e.g., 1, 5, or 10 seconds) during which the UE is not evaluated on the 5G connection to conserve WBS and network resources. Indeed, the WBS may send a signal to the UE to stop sending PHR reports during the delay to reduce signaling traffic and conserve the battery on the UE, among other things. If a delay is set, then at 310, the method 300 can determine if the delay has expired prior to continuing. If the delay has not expired, then at 310, the method 300 can continue to determine if the delay has expired. If the delay has expired, then at 302, the method 300 can reset and continue to monitor the UE iteratively.

If $PHR_1$ is greater than or equal to $PHR_{START}$, on the other hand, then at 312, the WBS can start a timer during which the UE will be monitored to determine whether PHR continues to increase towards the $TxP_{MAX}$, or decreases. In some examples, the timer may be set based on the reporting frequency of the PHR reports, for example, to enable the method 300 to receive a sufficient number of reports to identify a trend. If the reporting frequency is 10 ms, for example, then the timer may be set to 100 ms to enable the system to receive 10 PHR reports for analysis. Of course, the timer could be set to any value and can vary from system to system.

At 314, the counter can be incremented by one to enable the system to receive the next PHR report. At 316, the WBS can receive the next PHR report from the UE. In this example, since this is the second PHR report from the UE, it is $PHR_2$.

At 318, the WBS can determine if $PHR_2$ is greater than the maximum permissible PHR prior to the UE being disconnected, or $PHR_{DISCONNECT}$. $PHR_{DISCONNECT}$ may be set to be greater than $PHR_{START}$, but less than $TxP_{MAX}$. So, $PHR_{DISCONNECT}$ may be set to 95% or 98% of $TxP_{MAX}$ for the UE, for example, or at some other level at which the system can reliably disconnect from the UE prior to the connection dropping.

At 320, if $PHR_2$ is equal to, or higher than, $PHR_{DISCONNECT}$, then the WBS can send a signal to the UE to disconnect from the 5G connection and revert to a 4G-only connection. This can enable the UE to disconnect in a controlled manner rather than dropping the connection. This can also enable the UE to complete, terminate, or handover any functions using the 5G connection in a controlled manner, which may prevent errors on the UE and the network, among other things. Disconnecting in a controlled manner can also prevent the UE from negatively affecting the performance and/or reliability reports for the WBS. As mentioned above, if the UE drops the connection, for example, this may appear as an RLF on performance and/or reliability reports, which is to be avoided if possible.

Optionally, If $PHR_2$ is not greater than, or equal to, $PHR_{DISCONNECT}$, on the other hand, then at 322, the WBS can determine if $PHR_2$ is still greater than, or equal to, $PHR_{START}$—i.e., whether $PHR_2$ is still between $PHR_{START}$ and $PHR_{DISCONNECT}$—and warrants additional monitoring. If $PHR_2$ is less than $PHR_{START}$, then monitoring can cease and the method 300 can reset, or return to step 302. $PHR_2$ falling below the threshold value, $PHR_{START}$, can indicate that the conditions between the UE and the WBS are improving rather than deteriorating. This may be because atmospheric conditions have improved (e.g., it has stopped raining), the UE is now moving towards the WBS, etc. In other words, if $PHR_2$ is less than $PHR_{START}$, it may be considered stable enough to not warrant additional evaluation.

If $PHR_2$ is still between $PHR_{START}$ and $PHR_{DISCONNECT}$, on the other hand, then additional monitoring may be warranted. At 324, therefore, the WBS can determine whether the timer has expired. If the timer has expired, then the WBS can determine that, while the UE remains greater than or equal to $PHR_{START}$, the connection is stable enough to stop monitoring the UE. This may indicate that the UE is maintaining relatively the same distance from the WBS, for example, or that environmental conditions have stabilized, among other things.

If the timer has not expired, on the other hand, then at 314, the WBS can increment the counter by one (in this case to 3). At 312, the WBS can continue to monitor the UE by receiving $PHR_3$, and the method 300 repeats iteratively until either (1) the timer expires and monitoring is discontinued, (2) $PHR_X$ is less than $PHR_{START}$ and monitoring is discontinued, or (3) $PHR_X$ is greater than or equal to $PHR_{DISCONNECT}$ and the UE is disconnected.

In some examples, rather than using the timer, the method 300 can continue iteratively until $PHR_X$ is less than $PHR_{START}$. In other words, the method 300 can assume that anytime $PHR_X$ is greater than or equal to $PHR_{START}$, but less than $PHR_{DISCONNECT}$, it is sufficiently unstable to warrant further monitoring (but not to be disconnected). Essentially, the method 300 can repeat steps 314-322 and disregard step 324 (related to the timer). In this case, the system can simply continue to receive and analyze $PHR_X$ until (1) $PHR_X$ is less than $PHR_{START}$ or (2) $PHR_X$ is greater than or equal to $PHR_{DISCONNECT}$ and the UE is disconnected.

Figure 4:
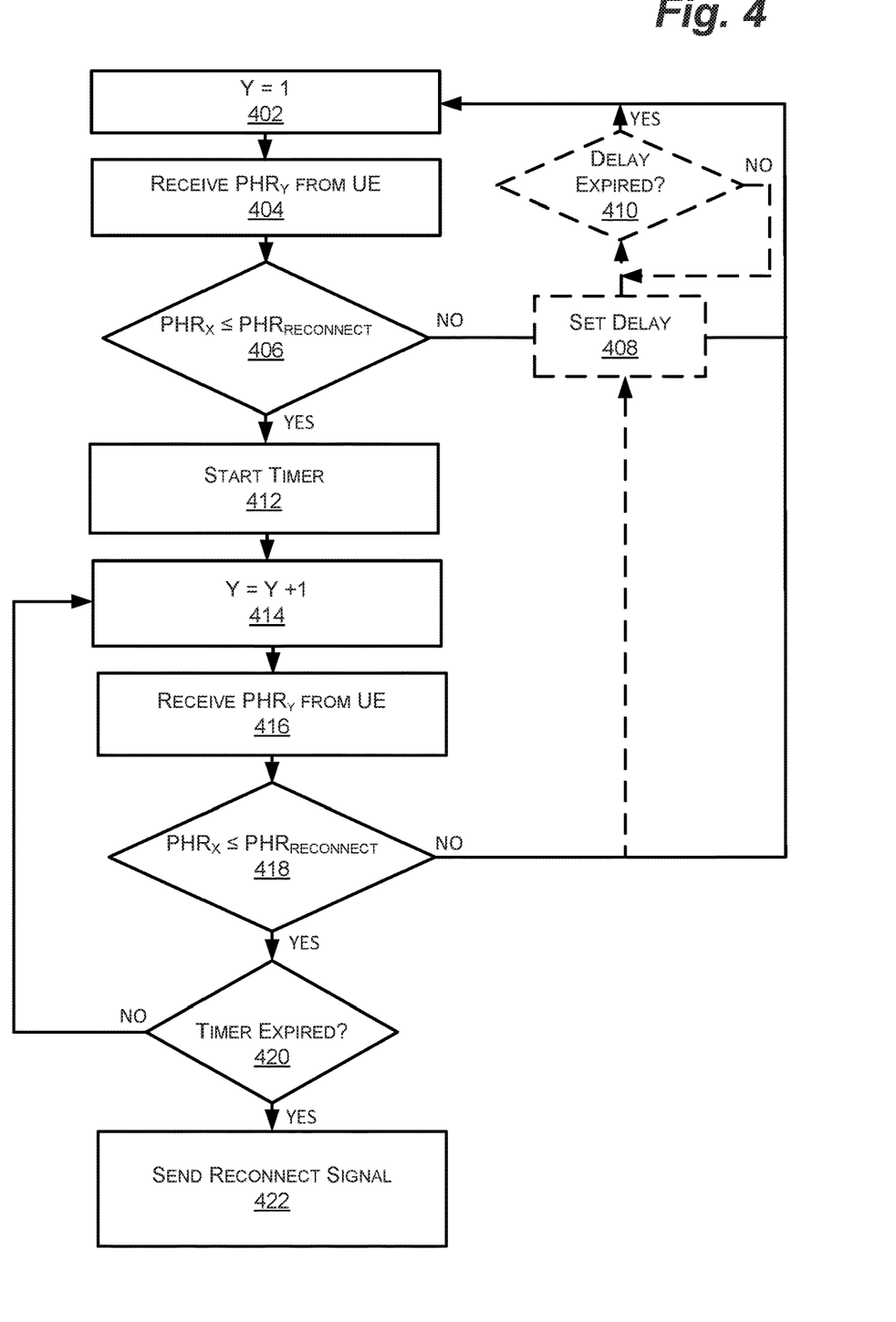
FIG. 4 is a flowchart depicting an example of a method for reconnecting the UE connected to multiple networks based on decreasing PHR on the network, in accordance with some examples of the present disclosure.

As shown in FIG. 4, in a similar manner, in some examples, after disconnection the UE must remain below a predetermined threshold, $PHR_{RECONNECT}$ for a predetermined amount of time before receiving a reconnect signal. In this manner, the stability of the connection between the UE and the WBS on the 5G connection, for example, can be verified to prevent simply having to immediately disconnect the 5G connection again. Thus, if the PHR report from the UE remains less than $PHR_{RECONNECT}$ for a predetermined amount of time, the WBS can send a reconnect signal to enable the UE to reconnect to the WBS on the 5G connection, while maintaining the 4G connection.

At 402, a counter, Y, can be used to determine how many PHR reports have been evaluated prior to reconnection. As mentioned above, the UE automatically sends PHR reports to the WBS periodically (e.g., every 10 ms) to enable the WBS to adjust the transmission power used by the UE. In this case, the WBS may evaluate a predetermined number of PHR reports (e.g., 5, 10, or 20) to ensure the connection between the UE and the WBS is sufficiently stable.

At 404, the WBS can receive a PHR report ($PHR_y$) from the UE. In this case, because it is the first report received (i.e., Y=1), it is $PHR_1$. At 406, the WBS can determine if $PHR_1$ is less than a predetermined level—$PHR_{RECONNECT}$—at which the system will begin to evaluate the UE for reconnection to the 5G network. This can be the same as, or different than, the previously mentioned levels (e.g., $PHR_{START}$ or $PHR_{DISCONNECT}$). In some examples, if the UE has fallen below $PHR_{START}$ or $PHR_{DISCONNECT}$ for a predetermined amount of time, for example, this may be deemed sufficient. In other examples, the WBS may set a lower threshold for $PHR_{RECONNECT}$ (e.g., 75% or 80% PHR) prior to reconnection to ensure that the connection is sufficiently stable.

If $PHR_1$ is not equal to, or less than $PHR_{RECONNECT}$, then the connection is not yet sufficiently stable to reconnect the UE to 5G. This may be because the UE is moving away from the WBS, for example, or that poor conditions still exist. In this case, the method 400 can reset and return to step 402. Optionally, at 408, in some examples, the WBS may set a delay (e.g., 1, 5, or 10 seconds) during which the UE is not evaluated on the 5G connection to conserve WBS and network resources. Indeed, the WBS may send a signal to the UE to stop sending PHR reports for the 5G connection during the delay to reduce signaling traffic and conserve the battery on the UE, among other things. If a delay is set, then at 410, the system can wait. If the delay has not expired then at 410, the system can continue to determine if the delay has expired. If the delay has expired, on the other hand, then at 402, the method 400 can reset and continue to monitor the UE iteratively.

If $PHR_1$ is less than or equal to $PHR_{RECONNECT}$, on the other hand, then at 412, the WBS can start a timer during which the UE will be evaluated to determine whether PHR remains less than $PHR_{RECONNECT}$. In some examples, the timer may be set based on the reporting frequency of the PHR reports, for example, to enable the system to receive a sufficient number of reports to identify a trend. If the reporting frequency is 10 ms, for example, then the timer may be set to 200 ms to enable the system to receive 20 PHR reports for analysis. Of course, the timer could be set to any value and can vary from system to system.

At 414, the counter, Y, can be incremented by one to enable the system to receive the next PHR report, in this example, $PHR_2$. At 416, the WBS can receive $PHR_2$ from the UE for evaluation. At 418, the WBS can again determine if $PHR_2$ is less than or equal to $PHR_{RECONNECT}$. As mentioned above, $PHR_{RECONNECT}$ can be chosen such that it is likely that, if reconnected on the 5G connection, the UE will remain connected for a useful amount of time. This time can be determined based on various network metrics such as, for example, network traffic levels, latency, availability, etc. If the 4G network is extremely busy, for example, then the time may be set to a shorter time because the network needs all available bandwidth. If the 4G network has excess capacity, on the other hand, but the WBS is extremely busy (e.g., there are many UEs connected to the WBS creating excessive signaling traffic), then the time may be higher to reduce signaling overhead on the WBS.

If $PHR_2$ is equal to, or less than, $PHR_{RECONNECT}$, then at 420, the WBS can determine if the timer has expired. As mentioned above, the timer is set to enable the WBS to receive a sufficient number of PHR reports that indicate the UE is below $PHR_{RECONNECT}$ to warrant reconnection to the 5G network. If the timer is set to 1 second, for example, and the UE sends PHR reports every 10 ms, then the UE must stay less than $PHR_{RECONNECT}$ for 100 PHR reports prior to reconnection. Of course, the timer can be set to any useful value and can also vary based at least in part on relevant network and UE parameters.

If the timer has not expired, then at 414, the counter, Y, can be incremented by one, in this case to 3. At 416, the WBS can receive $PHR_3$ and the method 400 can continue iteratively until either (1) the timer expires and the UE is reconnected to the 5G network, or (2) $PHR_Y$ is greater than or equal to $PHR_{RECONNECT}$ and the method starts over (i.e., returns to step 402). As mentioned above, optionally the method 400 can include a delay—at steps 408 and 410—between the UE equaling or going above $PHR_{RECONNECT}$ and the WBS reevaluating the UE for reconnection to the 5G network.

Returning to step 420, if the timer has expired, then the UE has remained below $PHR_{RECONNECT}$ for a sufficient amount of time to warrant reconnection to the 5G network. As a result, at 422, the WBS can send a reconnect signal to the UE to cause the UE to reconnect to the 5G network. The reconnect signal can comprise a radio resource control (RRC) reconfiguration message, for example, and may include an IP address, frequency pairs, and/or other information useful for the UE to reconnect to the WBS on the 5G network.

Figure 5:
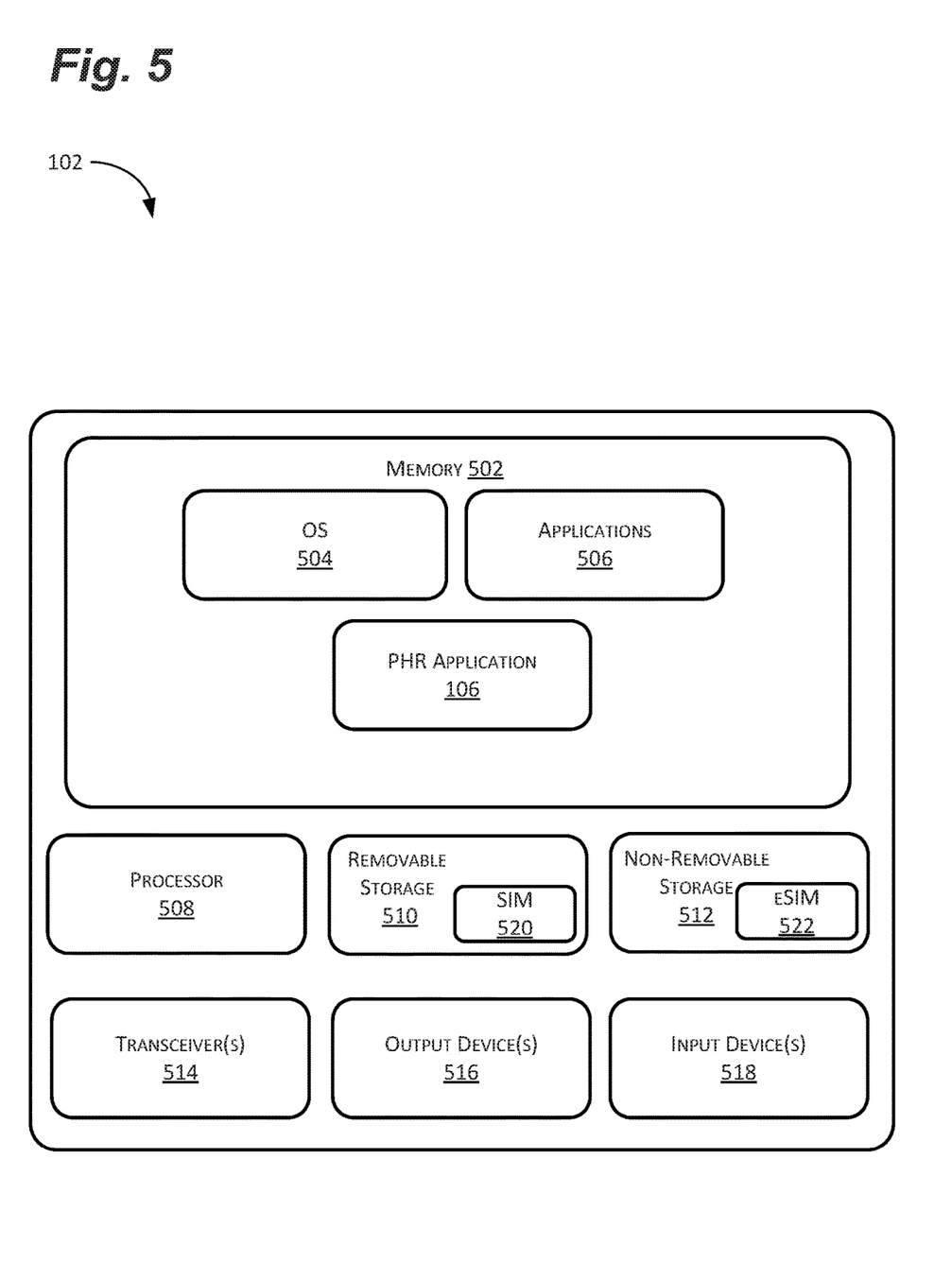
FIG. 5 is an example of a user equipment (UE) for use with the systems and methods disclosed herein, in accordance with some examples of the present disclosure.

FIG. 5 depicts a component level view of the UE 102 for use with the systems 100, 200 and methods 300, 400 described herein. The UE 102 could be any UE capable of using multiple networks on the IMS 200 and/or IP networks 208. For clarity, the UE 102 is described herein generally as a cell phone, smart phone, or laptop computer. One of skill in the art will recognize, however, that the systems 100, 200 and methods 300, 400 described herein can also be used with a variety of other electronic devices, such as, for example, tablet computers, desktops, and other network (e.g., cellular or IP network) connected devices. Indeed, the UE 102 can be any device that can access multiple networks (e.g., the 2G 202, 3G 204, 4G 110, and/or 5G 112 networks) that may benefit from improved multi-connection management.

The UE 102 can comprise several components to execute the above-mentioned functions. As discussed below, the UE 102 can each comprise memory 502 including an OS 504 and one or more standard applications 506. The standard applications 506 can include many features common to UE 102 such as, for example, contacts, calendars, call logs, voicemail, etc. In this case, the UE 102 can also comprise the PHR application 106, among other things.

The UE 102 can also comprise one or more processors 508 and one or more of removable storage 510, non-removable storage 512, transceiver(s) 514, output device(s) 516, and input device(s) 518. In some examples, such as for cellular communication devices, the UE 102 can also include a SIM 520 and/or an eSIM 522, which can include a mobile country code (MCC), mobile network code (MNC), international mobile subscriber identity (IMSI), and other relevant information. In some examples, one or more of the functions (e.g., standard applications 506 and/or the PHR application 106) can be stored on the SIM 520 or the eSIM 522 in addition to, or instead of, being stored in the memory 502.

In various implementations, the memory 502 can be volatile (such as random access memory (RAM)), nonvolatile (such as read only memory (ROM), flash memory, etc.), or some combination of the two. The memory 502 can include all, or part, of the Applications 106, 506 and the OS 504 for the UE 102, among other things. In some examples, rather than being stored in the memory 502, some, or all, of the Applications 106, 506, as well as other information (e.g., call history, contacts, etc.) can be stored on a remote server or cloud of servers accessible by the UE 102 such as a TAS 224.

The memory 502 can also include the OS 504. Of course, the OS 504 varies depending on the manufacturer of the UE 102 and currently comprises, for example, iOS 11.4.1 for Apple products and Pie for Android products. The OS 504 contains the modules and software that support a UE's basic functions, such as scheduling tasks, executing applications, and controlling peripherals. In some examples, the OS 504 can receive the PHR reports 108 from the PHR application 106, for example, and send the PHR reports 108 to the WBS 104 via the transceiver(s) 514. The OS 504 can also enable the UE 102 to send and retrieve data via a cellular data connection or internet connection and perform other functions.

As mentioned above, the UE 102 can also include the PHR application 106. The PHR application 106 can periodically (e.g., every 5, 10, or 20 ms) send the PHR report 108 to the WBS 104. In some examples, the PHR report 108 can be provided as a percentage of $TxP_{MAX}$. So, a PHR report of 90%, for example, indicates that the UE 102 is transmitting at 90% of $TxP_{MAX}$ and can only increase PHR by another 10%. In other examples, the PHR report 108 can include raw data, such as a current PHR in decibels (e.g., 14 dBm). In this configuration, the WBS 104 can include a list of maximum decibel levels, for example, for each UE 102 or type of UE 102, as described below. In other words, the WBS 104 can receive raw data and then compare the raw data to a table or determine the PHR for each UE 102.

Regardless, an advantage of the systems 100, 200 and methods 300, 400 discussed herein is that no modification to the UE 102 is required. In other words, most, if not all, UEs 102 already include the PHR application 106. In conventional systems, however, the PHR report 108 is used only to manage TxP via TPCs.

The UE 102 can also comprise one or more processors 508. In some implementations, the processor(s) 508 can be a central processing unit (CPU), a graphics processing unit (GPU), both CPU and GPU, or any other processing unit. The UE 102 may also include additional data storage devices (removable and/or non-removable) such as, for example, magnetic disks, optical disks, or tape. Such additional storage is illustrated in FIG. 5 by removable storage 510 and non-removable storage 512. The removable storage 510 and non-removable storage 512 can store some, or all, of the functions 106, 506 and/or the OS 504.

Non-transitory computer-readable media may include volatile and nonvolatile, removable and non-removable tangible, physical media implemented in technology for storage of information, such as computer readable instructions, data structures, program modules, or other data. The memory 502, removable storage 510, and non-removable storage 512 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the UE 102. Any such non-transitory computer-readable media may be part of the UE 102 or may be a separate database, databank, remote server, or cloud-based server.

In some implementations, the transceiver(s) 514 include any transceivers known in the art. In some examples, the transceiver(s) 514 can include wireless modem(s) to facilitate wireless connectivity with other components (e.g., the WBSs 104), the Internet, and/or an intranet via the cellular and IP networks. Specifically, the transceiver(s) 514 can include one or more transceiver(s) 514 that can enable the UE 102 to connect to multiple networks simultaneously. Thus, the UE 102 can include multiple transceiver(s) 514 or a single multi-frequency, multi-channel transceiver 514 to enable the UE 102 to connect to two or more of the 2G 202, 3G 204, 4G 110 and 5G 112 networks. The UE 102 can also include transceiver(s) 514 to enable the UE 102 to connect to future (e.g., 6G) networks, Internet-of-Things (IoT), machine-to machine (M2M), and other current and future networks.

The transceiver(s) 514 may also include radio transceiver(s) that perform the function of transmitting and receiving radio frequency communications via an antenna (e.g., Wi-Fi 206 or Bluetooth®). In other examples, the transceiver(s) 514 may include wired communication components, such as a wired modem or Ethernet port, for communicating via one or more wired networks. The transceiver(s) 514 can enable the UE 102 to send PHR reports 108, make voice and video calls, download files, access web applications, and provide other communications associated with the systems 100, 200 and methods 300, 400, described above.

In some implementations, the output device(s) 516 include any output devices known in the art, such as a display (e.g., a liquid crystal or thin-film transistor (TFT) display), a touchscreen, speakers, a vibrating mechanism, or a tactile feedback mechanism. In some examples, the output device(s) 516 can play a first sound when PHR equals $PHR_{START}$ to inform the user that the UE 102 is approaching $TxP_{MAX}$. In other examples, the output device(s) 516 can play a second sound when PHR equals $PHR_{DISCONNECT}$ to inform the user that the UE 102 is being disconnected from at least one network. Similarly, the output device(s) 516 can play a third sound when PHR equals $PHR_{RECONNECT}$ to inform the user that the UE 102 is being reconnected to at least one network. If the user stopped using an application—or an application stopped automatically—because a particular application preferably uses, or requires, a particular network (e.g., an OS update, which may be a large file, may download more quickly on a 5G 112 connection), for example, the third sound can inform the user that the application can resume because reconnection to the desired/required network has taken place. Output device(s) 516 can also include ports for one or more peripheral devices, such as headphones, peripheral speakers, or a peripheral display.

In various implementations, input device(s) 518 include any input devices known in the art. For example, the input device(s) 518 may include a camera, a microphone, or a keyboard/keypad. The input device(s) 518 can include the touch-sensitive display or a keyboard to enable users to enter data and make requests and receive responses via web applications (e.g., in a web browser), make calls, and use the applications 506, among other things. The touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like.

Figure 6:
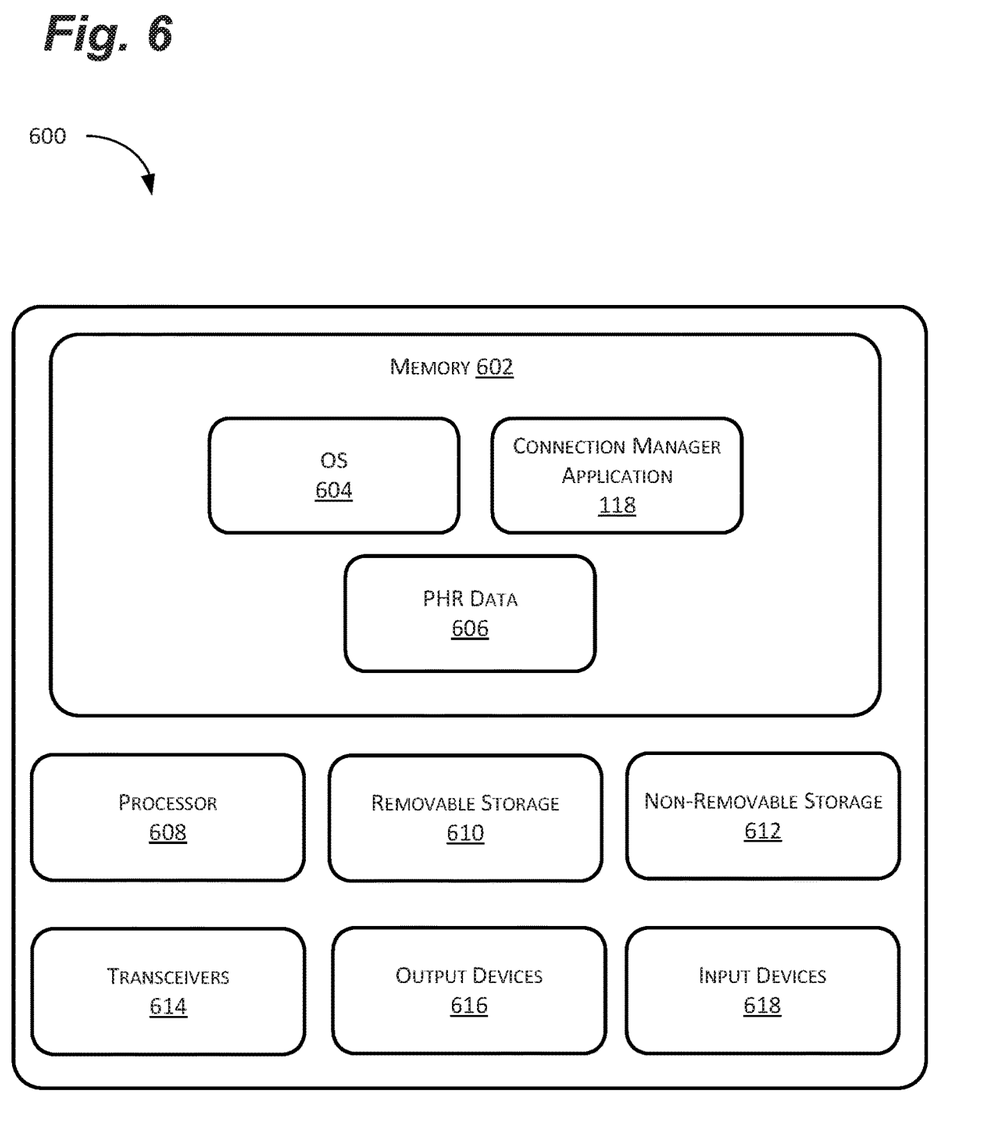
FIG. 6 is an example of a server for use with the systems and methods disclosed herein, in accordance with some examples of the present disclosure.

As shown in FIG. 6, the systems 100, 200 and methods 300, 400 can also be used in conjunction with the server 600. To simplify the discussion, the server 600 is discussed below as a standalone server. One of skill in the art will recognize, however, that the systems 100, 200 and methods 300, 400 disclosed herein can also be implemented partially, or fully, on a network entity such as, for example, the HLR/HSS 212, a 3GPP AAA server, or on an existing or new component of the WBSs 104. Thus, the discussion below in terms of the server 600 is not intended to limit the disclosure to the use of a standalone server. The server 600 can be a TAS 224, for example, capable of receiving and analyzing PHR reports 108 and managing connections for multiple UE, as discussed above.

The server 600 can comprise a number of components to execute part, or all, of the above-mentioned systems 100, 200 and methods 300, 400. The server 600 can comprise memory 602 including, for example, the connection manager application 118, an OS 604, and PHR data 606. In various implementations, the memory 602 can be volatile (such as RAM), non-volatile (such as ROM, flash memory, etc.), or some combination of the two. The memory 602 can include all, or part, of the modules 118, 606 and the OS 604 for the server 600, among other things.

The OS 604 can vary depending on the manufacturer of the server 600 and the type of component. Many servers, for example, run Linux or Windows server. Dedicated cellular routing servers, such as servers located in WBSs 104, may run specific telecommunications OSs. The OS 604 contains the modules and software that supports a computer's basic functions, such as scheduling tasks, executing applications, and controlling peripherals. The OS 604 can enable the server 600 to receive and analyze PHR reports 108, for example, and to manage disconnecting and reconnecting UE 102 in communication with the server 600 (e.g., via a 4G 110 and/or a 5G 112 connection). In some examples, as discussed below, the OS 604 can also enable the server 600 to perform some, or all, of the systems 100, 200 and methods 300, 400 discussed herein.

In some examples, the server 600 can also include the connection manager application 118. The connection manager application 118 can receive PHR reports 108 from the UE 102 and compare the PHR reports 108 to predetermined limits. Based on the comparison, the connection manager application 118 may then monitor, disconnect, and/or reconnect the UE 102. Thus, as the PHR report 108 for the UE 102 approaches $PHR_{START}$ (e.g., 80% or 85%), the connection manager application 118 may monitor the UE 102 for a predetermined period of time. If, during that time, the PHR report 108 continues to increase to $PHR_{DISCONNECT}$ (e.g., 90% or 95%), then the connection manager application 118 can cause the server 600 to send a signal to the UE 102 to cause the UE 102 to disconnect from at least one network. If, on the other hand, during the predetermined period of time, the PHR report 108 stays less than the $PHR_{DISCONNECT}$, the connection manager application 118 may determine that the connection between the WBS 104 and the UE 102 is sufficiently stable and do nothing. In a similar manner, if the PHR report 108 falls below a third predetermined value, $PHR_{RECONNECT}$ (which may be the same as, or different than, either the $PHR_{START}$ or $PHR_{DISCONNECT}$) then the connection manager application 118 may send a signal to cause the UE 102 to reconnect to at least one network.

In some examples, the server 600 can also include PHR data 606. As the name implies, the PHR data 606 can include data related to $TxP_{MAX}$, $PHR_{START}$, $PHR_{DISCONNECT}$, and/or $PHR_{RECONNECT}$, among other things, for each UE 102, each type of UE, etc. Thus, in some examples, the PHR data 606 can include a table of different UEs 102, for example, and a PHR at which the connection for that UE 102 is likely to become unstable. So, more modern UE 102 may have a higher $PHR_{DISCONNECT}$ (e.g., 95% or 98%), while older UE 102 may have a lower $PHR_{DISCONNECT}$ (e.g., 85%) due to less sophisticated antennas, transceiver(s), software, etc.

In other examples, the PHR data 606 can simply include a $TxP_{MAX}$ for each UE 102, each type of UE, etc. In other words, rather than providing the PHR report 108 as a percentage, the UE 102 may simply provide raw data for the current TxP setting (e.g., 10 dBm). The server 600 can then compare this data to a table of $TxP_{MAX}$ to make connection decisions. Indeed, each UE 102 and/or each WBS 104 may have different settings based on environmental, topographical, and other factors.

The server 600 can also comprise one or more processors 608. In some implementations, the processor(s) 608 can be a central processing unit (CPU), a graphics processing unit (GPU), both CPU and GPU, or any other processing unit. The server 600 can also include one or more of removable storage 610, non-removable storage 612, transceiver(s) 614, output device(s) 616, and input device(s) 618.

The server 600 may also include additional data storage devices (removable and/or non-removable) such as, for example, magnetic disks, optical disks, or tape. Such additional storage is illustrated in FIG. 6 by removable storage 610 and non-removable storage 612. The removable storage 610 and non-removable storage 612 can store some, or all, of the OS 604 and other modules 118, 606.

Non-transitory computer-readable media may include volatile and nonvolatile, removable and non-removable tangible, physical media implemented in technology for storage of information, such as computer-readable instructions, data structures, program modules, or other data. The memory 602, removable storage 610, and non-removable storage 612 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the server 600. Any such non-transitory computer-readable media may be part of the server 600 or may be a separate database, databank, remote server, or cloud-based server.

In some implementations, the transceiver(s) 614 include any transceivers known in the art. In some examples, the transceiver(s) 614 can include wireless modem(s) to facilitate wireless connectivity with the UE 102, the Internet, the cellular network, and/or an intranet via a cellular connection. As with the UE 102, the transceiver(s) 614 may enable the server 600 to connect with the UE 102 on multiple networks (e.g., the 3G 204, 4G 110, and 5G 112 networks), e.g., when the server 600 is a component of the WBS 104. In other examples, the server 600 can be a standalone server or an existing network entity, for example, and can be in communication with the WBS 104 via an internet, satellite, or other connection.

The transceiver(s) 614 may include a radio transceiver that performs the function of transmitting and receiving radio frequency communications via an antenna (e.g., Wi-Fi 206 or Bluetooth®) to connect to the IP network 208 or another network. In other examples, the transceiver(s) 614 may include wired communication components, such as a wired modem or Ethernet port. The transceiver(s) 614 can enable the server 600 to communicate with the UE 102 and WBS 104, among other things.

In some implementations, the output device(s) 616 include any output devices known in the art, such as a display (e.g., a liquid crystal or thin-film transistor (TFT) display), a touchscreen display, speakers, a vibrating mechanism, or a tactile feedback mechanism. In some examples, the output device(s) 616 can play various sounds based on, for example, when a PHR report 108 is received, when a UE 102 must be connected or disconnected, etc. Output device(s) 616 can also include ports for one or more peripheral devices, such as headphones, peripheral speakers, or a peripheral display.

In various implementations, input device(s) 618 include any input devices known in the art. For example, the input device(s) 618 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

While several possible examples are disclosed above, examples of the present disclosure are not so limited. For instance, while the systems 100, 200 and methods 300, 400 above are discussed with reference to managing 4G 110 and 5G 112 connections, the system could be used to manage multiple connections for many types of networks, including other cellular networks (e.g., 2G 202 and 3G 204 networks). Indeed, the systems 100, 200 and methods 300, 400 discussed herein could be used in the same, or a similar, manner to manage many kinds of devices that are capable of connecting to multiple wireless networks. In addition, while various functions are discussed as being performed on the UE 102 and/or on the WBS 104, for example, other components, such as various network entities, could perform some, or all, of these functions without departing from the spirit of the invention. And, while the disclosure is primarily directed to UEs 102 on cellular networks, it can also be used with other types of networks and on other devices (e.g., other IP network 208, M2M, or IoT devices) on the same, or similar, networks or future networks.

Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A server comprising:
    a transceiver to send and receive at least one of wired or wireless transmissions;
    memory storing computer-executable instructions; and
    a processor in communication with at least the transceiver and the memory, the computer-executable instructions causing the processor to perform acts comprising:
        receiving, with the transceiver, a first power headroom (PHR) report from a user equipment (UE) connected to a first network and a second network, the first PHR report being associated with the first network and measuring a percentage of a maximum transmit power being used by the UE at a first time;
        determining that the percentage measured in the first PHR report is greater than or equal to a first threshold percentage;

in response to determining that the percentage measured in the first PHR report is greater than or equal to the first threshold percentage, starting a first timer set to expire in a first amount of time;

receiving, with the transceiver, a second PHR report from the UE, the second PHR report being associated with the first network and measuring a percentage of a maximum transmit power being used by the UE at a second time, the second time occurring between the starting and expiring of the first timer;

determining that the percentage measured in the second PHR report is greater than or equal to a second threshold percentage; and in response to determining that the percentage measured in the second PHR report is greater than or equal to the second threshold percentage, sending, with the transceiver, a first signal to cause the UE to disconnect from the first network;

wherein the second threshold percentage is greater than the first threshold percentage.

2. The server of claim 1, the computer-executable instructions further causing the processor to perform the acts comprising:

receiving, with the transceiver, a third PHR report from the UE, the third PHR report being associated with the first network and measuring a percentage of a maximum transmit power being used by the UE at a third time;

determining that the percentage measured in the third PHR report is less than a third threshold percentage;

in response to determining that the percentage measured in the third PHR report is less than the third threshold percentage, starting a second timer set to expire in a second amount of time;

receiving, with the transceiver from the UE, a fourth PHR report, the fourth PHR report being associated with the first network and measuring a percentage of a maximum transmit power being used by the UE at a fourth time, the fourth time occurring between the starting and expiring of the second timer;

determining that the percentage measured in the fourth PHR report is less than the second threshold percentage; and in response to determining that the percentage measured in the fourth PHR report is less than the second threshold percentage, sending, with the transceiver, a second signal to cause the UE to reconnect to the first network.

3. The server of claim 1, wherein:
the first threshold percentage is between 85% and 90%; and
the second threshold percentage is between 90% and 95%.

4. The server of claim 3, wherein the first threshold percentage is 90% and the second threshold percentage is 95%.

5. The server of claim 1, wherein the server is a service architecture evolution gateway (SAE GW).

6. The server of claim 1, wherein:
the first network is a fifth-generation (5G) network; and
the second network is a fourth-generation (4G) network.

7. A method comprising:
receiving, at a transceiver of a wireless base station (WBS), a first power headroom (PHR) report from a user equipment (UE) connected to a first network and a second network, the first PHR report being associated with the first network and measuring a percentage of a maximum transmit power being used by the UE at a first time;

determining, with a processor of the WBS, that the percentage measured in the first PHR report is greater than or equal to a first threshold percentage;

in response to determining that the percentage measured in the first PHR report is greater than or equal to the first threshold percentage, starting, with the processor, a first timer set to expire in a first amount of time;

receiving, with the transceiver, a second PHR report, the second PHR report being associated with the first network and measuring a percentage of a maximum transmit power being used by the UE at a second time, the second time occurring between the starting and expiring of the first timer;

determining, with the processor, that percentage measured in the second PHR report is less than a second threshold percentage; and in response to determining that the percentage measured in the second PHR report is less than the second threshold percentage, setting, with the processor, a second timer set to expire in a second amount of time; and wherein PHR reports received from the UE prior to the expiry of the second timer are disregarded.

8. The method of claim 7, further comprising:
receiving, at the transceiver, a third PHR report from the UE, the third PHR report being associated with the first network and measuring a percentage of a maximum transmit power being used by the UE at a third time;

determining, with the processor, that the percentage measured in the third PHR report is greater than or equal to the first threshold percentage;

in response to determining that the percentage measured in the third PHR report is greater than or equal to the first threshold percentage, starting, with the processor, a third timer set to expire in the first amount of time;

receiving, with the transceiver, a fourth PHR report, the fourth PHR report being associated with the first network and measuring a percentage of a maximum transmit power being used by the UE at a fourth time, the fourth time occurring between the starting and expiring of the third timer;

determining, with the processor, that the percentage measured in the fourth PHR report is greater than or equal to the second threshold percentage; and in response to determining that the percentage measured in the fourth PHR report is greater than or equal to the second threshold percentage, sending, with the transceiver, a first signal to the UE to cause the UE to disconnect from the first network.

9. The method of claim 8, wherein the first network is a fifth generation (5G) network and the second network is a fourth generation (4G) network.

10. The method of claim 8, further comprising:
receiving, at the transceiver, a fifth PHR report from the UE, the fifth PHR report being associated with the first network and measuring a percentage of a maximum transmit power being used by the UE at a fifth time;

determining, with the processor, that the percentage measured in the fifth PHR report is less than a third threshold percentage;

in response to determining that the percentage measured in the fifth PHR report is less than the third threshold percentage, starting, with the processor, a fourth timer set to expire in a third amount of time;

receiving, with the transceiver, a sixth PHR report, the sixth PHR report being associated with the first network and measuring a percentage of a maximum transmit power being used by the UE at a sixth time, the sixth time occurring between the starting and expiring of the fourth timer;

determining, with the processor, that the percentage measured in the sixth report is less than the third threshold percentage; and in response to determining that the percentage measured in the sixth PHR report is less than the third threshold percentage, sending, with the transceiver, a second signal to the UE to cause the UE to reconnect to the first network.

11. The method of claim 10, wherein the third threshold percentage is equal to the second threshold percentage.

12. The method of claim 10, wherein the third threshold percentage is equal to the first threshold percentage.

13. The method of claim 7, wherein:
the first threshold percentage is between 80% and 90%; and
the second threshold percentage is between 90% and 100%.

14. A wireless base station (WBS) comprising:
a first transceiver to send and receive wireless transmissions on a first network;
a second transceiver to send and receive wireless transmissions on a second network;
memory storing computer-executable instructions including at least a connection manager application; and
a processor in communication with at least the transceiver and the memory, the computer-executable instructions causing the processor to perform acts comprising:
receiving, with the first transceiver from a user equipment (UE) connected to the first network and the second network, a first power headroom (PHR) report associated with the first network and measuring a percentage of a maximum transmit power being used by the UE at a first time;
receiving, with the second transceiver from the UE, a second PHR report associated with the second network and measuring a percentage of a maximum transmit power being used by the UE at a second time;
determining, with the connection manager application, that the percentage measured in the first PHR report is greater than or equal to a first threshold percentage;
in response to determining that the percentage measured in the first PHR report is greater than or equal to a first threshold percentage, starting, with the processor, a first timer set to expire in a first amount of time;
receiving, with the first transceiver, a third PHR report from the UE and measuring a percentage of a maximum transmit power being used by the UE at a third time, the third time occurring between the starting and expiring of the first timer; and
determining, with the connection manager application, that the percentage measured in the third PHR report is greater than or equal to a second threshold percentage.

15. The WBS of claim 14, the computer-executable instructions further causing the processor to perform acts comprising:
receiving, with the first transceiver, a fourth PHR report associated with the first network and a fifth PHR report associated with the second network, the fourth PHR report measuring a percentage of a maximum transmit power being used by the UE at a fourth time and the fifth PHR report measuring a percentage of a maximum transmit power being used by the UE at a fifth time;
determining, with the connection manager application, that the percentage measured in the fourth third PHR report is greater than or equal to the first threshold percentage;
in response to determining that the percentage measured in the fourth PHR report is great than or equal to the first threshold percentage, restarting, with the processor, the first timer;
receiving, with the first transceiver from the UE, a sixth PHR report associated with the first network and measuring a percentage of a maximum transmit power being used by the UE at a sixth time, the sixth time occurring between the restarting and expiring of the first timer;
determining, with the connection manager application, that the percentage measured in the sixth PHR report is greater than or equal to the second threshold percentage; and
in response to determining that the percentage measured in the sixth PHR report is greater than or equal to the second threshold percentage, sending, with the first transceiver, a first signal to the UE to cause the UE to disconnect from the first network.

16. The WBS of claim 15, wherein:
the first network is a fifth generation (5G) network; and
the second network is a fourth generation (4G) network.

17. The WBS of claim 15, wherein a UE uplink frequency associated with the first network is a millimeter-wave frequency.

18. The WBS of claim 15, the computer-executable instructions further causing the processor to perform acts comprising:
receiving, at the first transceiver, a seventh PHR report from the UE, the seventh PHR report being associated with the first network and measuring a percentage of a maximum transmit power being used by the UE at a seventh time;
determining, with the processor, that the percentage measured in the seventh PHR report is less than a third threshold percentage;
in response to determining that the percentage measured in the seventh PHR report is less than the third threshold percentage, starting, with the processor, a second timer set to expire in a second amount of time;
receiving, with the first transceiver, an eighth PHR report, the eighth PHR report being associated with the first network and measuring a percentage of a maximum transmit power being used by the UE at an eighth time, the eighth time occurring between the starting and expiring of the second timer;
determining, with the processor, that the percentage measured in the eighth PHR report is less than the third threshold percentage; and
in response to determining that the percentage measured in the eighth PHR report is less than the third threshold percentage, sending, with the first transceiver, a second signal to the UE to cause the UE to reconnect to the first network.

19. The WBS of claim 18, the computer-executable instructions further causing the processor to perform acts comprising:

receiving, with the first transceiver, a ninth PHR report associated with the first network and measuring a percentage of a maximum transmit power being used by the UE at a ninth time;

receiving, with the second transceiver, a tenth PHR report associated with the second network and measuring a percentage of a maximum transmit power being used by the UE at a tenth time;

determining, with the connection manager application, that the percentage measured in the ninth PHR report is greater than or equal to the first threshold percentage;

in response to determining that the percentage measured in the ninth PHR report is greater than or equal to the first threshold percentage, again restarting, with the processor, the first timer;

receiving, with the second transceiver from the UE, an eleventh PHR report associated with the second network and measuring a percentage of a maximum transmit power being used by the UE at an eleventh time, the eleventh time occurring between the again restarting and expiring of the first timer;

determining, with the connection manager application, that the percentage measured in the eleventh PHR report is greater than or equal to the second threshold percentage; and in response to determining that the percentage measured in the eleventh PHR report is greater than or equal to the second threshold percentage, sending, with the second transceiver, a second signal to the UE to cause the UE to disconnect from the second network.

* * * * *